United States Patent [19]
Gleason et al.

[11] Patent Number: 5,723,044
[45] Date of Patent: Mar. 3, 1998

[54] WATER FILTRATION SYSTEM FOR CONTROL OF THE ZEBRA MUSSEL

[75] Inventors: Harry C. Gleason; Jeffrey L. Bond, both of Romulus, N.Y.

[73] Assignee: Zebra Mussel Filter Systems, Inc., Romulus, N.Y.

[21] Appl. No.: 779,900

[22] Filed: Jan. 7, 1997

Related U.S. Application Data

[63] Continuation-in-part of Ser. No. 662,417, Jun. 10, 1996, abandoned, which is a continuation-in-part of Ser. No. 509,353, Jul. 31, 1995, Pat. No. 5,525,222.

[51] Int. Cl.$^6$ .......................... B01D 35/02; B01D 35/31; B01D 35/28

[52] U.S. Cl. .......................... 210/170; 210/315; 210/316; 210/323.2; 210/338; 210/435; 210/460; 210/489; 210/499

[58] Field of Search .......................... 210/170, 314, 210/315, 316, 323.2, 338, 342, 435, 460, 489, 492, 497.01, 499, 500.1

[56] References Cited

U.S. PATENT DOCUMENTS

| | | |
|---|---|---|
| 304,318 | 9/1884 | Hean . |
| 344,813 | 7/1886 | Bull et al. . |
| 616,364 | 12/1898 | Shreeve . |
| 1,026,616 | 5/1912 | Smith . |
| 1,585,409 | 5/1926 | Mayers . |
| 2,024,646 | 12/1935 | Jones . |
| 2,300,952 | 11/1942 | May . |
| 3,722,686 | 3/1973 | Arnett et al. . |
| 4,259,097 | 3/1981 | Patel et al. . |
| 4,550,778 | 11/1985 | Sullivan et al. . |
| 4,579,665 | 4/1986 | Davis et al. . |
| 4,816,163 | 3/1989 | Lyons et al. . |
| 4,857,163 | 8/1989 | Lyons et al. . |
| 4,906,235 | 3/1990 | Lyons et al. . |
| 4,970,239 | 11/1990 | Whitekettle et al. . |
| 5,008,075 | 4/1991 | Rufolo . |
| 5,011,615 | 4/1991 | Minderman . |
| 5,015,395 | 5/1991 | Muia et al. . |
| 5,040,487 | 8/1991 | Bollyy et al. . |
| 5,062,967 | 11/1991 | Muia et al. . |
| 5,069,722 | 12/1991 | Murphy . |

OTHER PUBLICATIONS

Federal Legislative Update, Sea Grant Program–New York State Non–Indigenous Aquatic Nuisance Prevention and Control, pp. 1–3.

Sea Grant, Dreissana Polymorpha: An Unwelcome New Great Lakes Invader, Charles R. O'Neill, Jr., Date: Nov. 1989, Revised: Feb. 1990.

Water Ways, NY Waterfront News, vol. 2, No. 10, Nov./Dec. 1991, pp. 4–6.

Great Lakes Sea Grant Network, Zebra Mussels: A 1991 Great Lakes Overview, pp. 1–8.

Second International Zebra Mussel Research Conference, Conference Proceedings, Nov. 1991, pp. 1–51.

(List continued on next page.)

*Primary Examiner*—Neil McCarthy
*Attorney, Agent, or Firm*—Howard J. Greenwald

[57] ABSTRACT

A water filtration system for preventing a Zebra Mussel from entering a water system having a water intake line extending into an aquatic environment exposed to Zebra Mussels. The system contains an intake line connection for connecting the filtration system to the intake line; at least one water collection line extending from the intake line connection; a water intake line which is disposed sub-statantially parallel to the water collection line and which contains an orifice with a top surface and a copper screen recessed at least about 2.5 inches from the top surface; a first water filter and a second water filter, wherein each of these filters has a largest pore size that is small enough to prevent passage of an egg or veliger of Zebra Mussels; a a copper screen surrounding each of the first water filter and said second water filter; and a housing surrounding each of the water filters and including a first filter intake and a second filter intake.

12 Claims, 4 Drawing Sheets

OTHER PUBLICATIONS

Dreissena Polymorpha Information Review, NY State Sea Grant Ext NY Zebra Mussel Inform. Clearinghouse, vol. 1, No. 1, Sep./Oct. 1990.

Dreissena Polymorpha Information Review, NY State Sea Grant Ext NY Zebra Mussel Inform. Clearinghouse, vol. 1, No. 2, Dec. 1990.

Dreissena Polymorpha Information Review, NY State Sea Grant Ext NY Zebra Mussel Inform. Clearinghouse, vol. 2, No. 1, Jan./Feb. 1991.

Dreissena Polymorpha Information Review, NY State Sea Grant Ext NY Zebra Mussel Inform. Clearinghouse, vol. 2, No. 2, Mar./Apr. 1991, pp. 1–12.

Dreissena Polymorpha Information Review, NY State Sea Grant Ext NY Zebra Mussel Inform. Clearinghouse, vol. 2, No. 3, May/Jun. 1991, pp. 1–12.

Dreissena Polymorpha Information Review, NY State Sea Grant Ext NY Zebra Mussel Inform. Clearinghouse, vol. 2, No. 4, Jul./Aug. 1991, pp. 1–12.

Dreissena Polymorpha Information Review, NY State Sea Grant Ext NY Zebra Mussel Inform. Clearinghouse, vol. 2, No. 5, Sep./Oct. 1991, pp. 1–12.

Dreissena Polymorpha Information Review, NY State Sea Grant Ext NY Zebra Mussel Inform. Clearinghouse, vol. 2, No. 6, Nov./Dec. 1991, pp. 1–12.

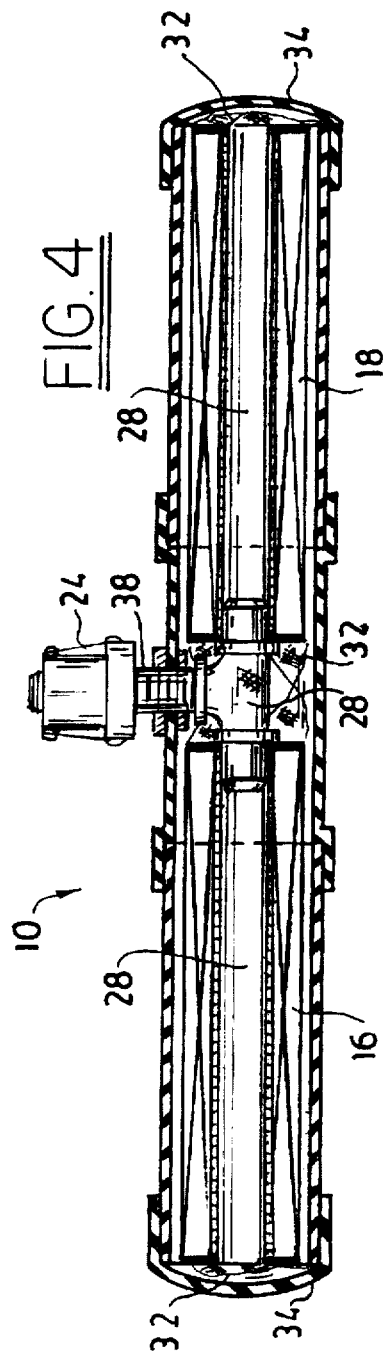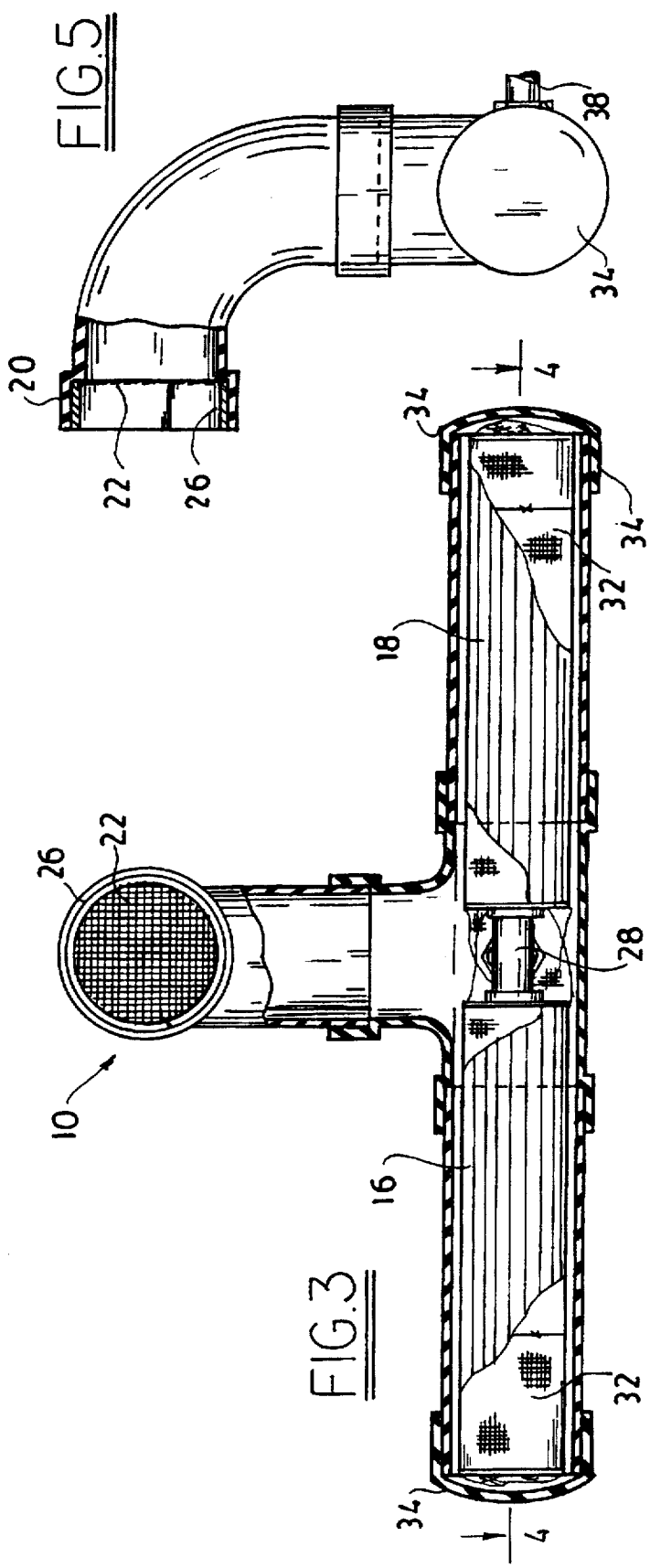

5,723,044

WATER FILTRATION SYSTEM FOR CONTROL OF THE ZEBRA MUSSEL

CROSS-REFERENCE TO RELATED PATENT APPLICATION

This application is a continuation-in-part of applicants' patent application Ser. No. 08/662,417, filed Jun. 10, 1996, abandoned which in turn was a continuation-in-part of applicants' patent application Ser. No. 08/509,353, filed on Jul. 31, 1995, now U.S. Pat. No. 5,525,222.

FIELD OF THE INVENTION

A water filtration system for controlling the spread of the zebra mussels into a water system; the system has a water intake line extending into an aquatic environment exposed to zebra mussels.

BACKGROUND OF THE INVENTION

In applicants' U.S. Pat. No. 5,525,222, a water filtration system for the control of zebra mussels is described. The entire disclosure of U.S. Pat. No. 5,525,222 is hereby incorporated by reference into this specification.

In particular, U.S. Pat. No. 5,525,222 describes a water filtration device for preventing a Zebra Mussel from entering a water intake system which has a water intake line extending into an aquatic environment exposed to Zebra Mussels. The device contains an intake line connection for connecting the filtration device to the intake line. The device also contains at least one water collection line extending from the intake line connection. The device also contains a water filter having a largest pore size that is small enough to prevent passage of an egg or veliger of Zebra Mussels, operatively associated with each of the collection lines such that any water passing through the collection lines must pass through the filter and into the collection line. The device also contains a copper screen surrounding the water filter, and a housing surrounding the filter and including a filter intake such that any water entering the housing and passing through the filters enters through the filter intake.

The filtration system of U.S. Pat. No. 5,525,222, although substantially superior to prior art systems, often became fouled by sediment from the aquatic environment, and, consequently, sometimes would suffer from a substantial reduction in the flow of water through it.

It is an object of this invention to provide a filtration system which is less likely than the prior art filtration system of U.S. Pat. No. 5,525,222 to be fouled by sediment from the aquatic environment in which it is situated.

It is another object of this invention to provide a filtration system which will maintain a relatively high volume of water flow over extended periods of time.

It is yet another object of this invention to provide a filtration system which is relatively easy to connect to existing water lines.

It is an object of this invention to provide an improved filtration system which is substantially easier to service and maintain than prior art filtration systems.

SUMMARY OF THE INVENTION

In accordance with this invention, there is provided a water filtration system for preventing a zebra mussel from entering a water system. This filtration system has a water intake line extending into an aquatic environment, an intake line connection, a water collection line extending from the intake line connection, two water filters, a copper screen surrounding each of the water filters, and a housing surrounding the water filters.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 3 is a front cut away view of the filtration system of FIG. 2;

FIG. 4 is a top cut away top view of the filtration system of FIG. 2; filtration system, with two filters FIG. 5 is an end view of the filtration system of FIG. 2;

DESCRIPTION OF THE PREFERRED EMBODIMENTS

The water filtration system of the present invention is adapted to control the spread of zebra mussels into a water system having a water intake line extending into an aquatic environment exposed to Zebra Mussels. As used in this specification, the term "aquatic environment" broadly encompasses any lake, stream river, pond, pool, and any other collection of water that is capable of being invaded by zebra mussels, such as aquariums, shore wells, beach wells, or water surrounding an intake line. The term "water system for a dwelling unit", as used herein, refers to a broad category of light use water systems which are particularly amenable to the benefits of water filtration systems for the intake line.

Figure 1:
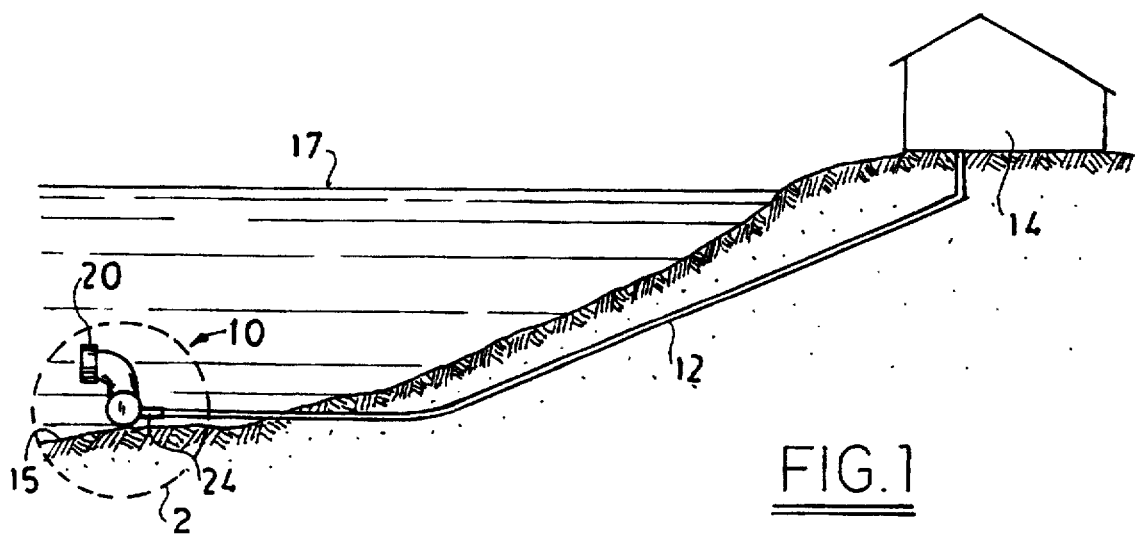
FIG. 1 is a side view of a water filtration system connected to an intake line.
Figure 2:
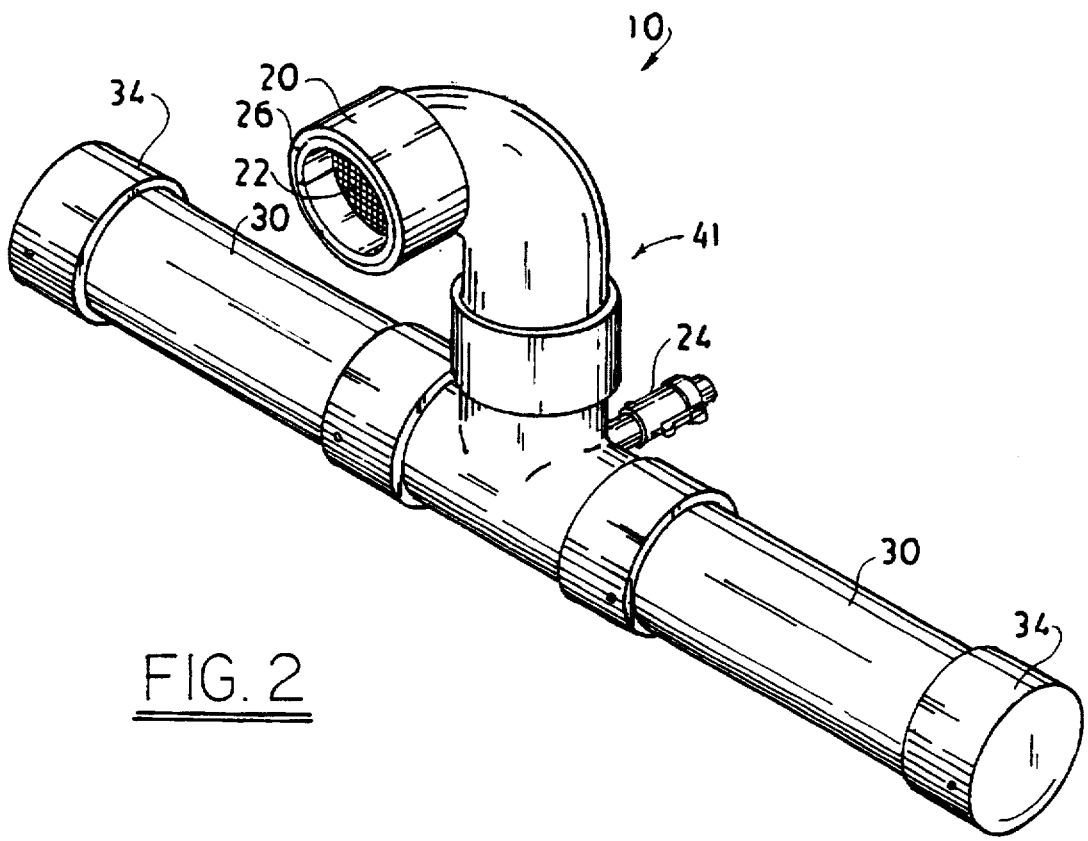
FIG. 2 is a perspective view of a preferred embodiment of a water filtration system with a vertical intake line.

FIG. 1 is a side view of a water filtration device connected to the intake line 12 for a water system of a residential dwelling 14. FIG. 2 is a perspective view of one embodiment of a water filtration system 10 of the present invention with two filters 16 and 18 positioned horizontally.

Referring to FIG. 1, and in the preferred embodiment depicted therein, it will be seen that filtration device 10 preferably is disposed on the bottom 15 of the aquatic environment at a depth sufficient to cause water to flow through intake line 12. Generally, device 10 is disposed at least from about 6 to about ten feet below the water surface 17. It is preferred that the device 10 be disposed at least ten feet below water surface 17.

Referring to FIG. 2, it will be seen that filtration device 10 is comprised of an intake 20 containing a recessed screen 22.

It will be seen that filtration device 10, in addition to intake 20, also comprises connector 24 for connecting filtration device 10 to intake water line 12. In the embodiment depicted in FIG. 1, connector 24 is substantially parallel to intake 20.

The intake 20 is adjustable, i.e., it can be rotated either clockwise or counterclockwise in increments as small 5 degrees or less so that, e.g., it can face in the same direction as connector 24. However, it is preferred that intake 20 always be substantially parallel to connector 24 so that the direction of water flowing into intake 20 is substantially parallel to the direction of water flowing through connector 24. It will be apparent to those skilled in the art that the term "substantially parallel" includes minor deviations of up to about 30 degrees from true parallel planes.

Referring to FIG. 2, it will be seen that screen 22 is recessed from the face 26 of intake 20 by at least about 2.5 inches. Although not wishing to be bound to any particular theory, applicants believe that this construction reduces clogging due to the intake of sediment.

In one preferred embodiment, screen 22 is recessed from face 26 by at least about 3.0 inches.

It is preferred that intake 20 have an internal diameter of from about 4 to 10 inches and, preferably, 5 to 7 inches. In one especially preferred embodiment, intake 20 has an internal diameter of about 6.0 inches.

Referring again to FIG. 2, and in the preferred embodiment depicted therein, it will be seen that connector 24 is a "quick connect" connector which allows ready connection to the water line 12. These type of "quick connect" connectors are well known and commercially available. Thus, one suitable connector 24 is sold as "CAM-LOCK" by American Manufacturers, Inc. of Manassas, Va.

In another embodiment, not shown, a conventional threaded connector 24 is used.

Referring again to FIG. 2, and in the embodiment depicted therein, it will be seen that filtration system 10 is comprised of water filters 16 and 18, each of which has a largest pore size that is small enough to prevent passage of an egg or veliger of zebra mussels.

Referring to FIGS. 3 and 4, it will be seen that each of water filters 16 and 18 is operatively associated with the collection line 28 such that any water passing through the collection lines 28 must have passed through the filter 16 or the filter 18 and into the collection line 28.

Referring again to FIG. 2, it will be seen that housing 30 surrounds the filters 16 and 18, each of which is encased in copper mesh. The housing 30 includes the filter intake 20 such that any water entering the housing 30 and passing through the filters 16 and/or 18 enters through the filter intake 20.

As indicated hereinabove, recessed screen 22 is part of intake 20. It is preferred that screen 22 be a copper mesh screen. In one embodiment, the copper mesh screen has approximately 44 mesh squares per square inch.

Referring again to FIGS. 3 and 4, and in the preferred embodiment depicted therein, it will be seen that the filters 16 and 18 are preferably of sufficient surface area to draw water through the water filtration system effectively under normal operation of the water system. In one embodiment, it is preferred that each of filters 16 and 18 have at least about 100 square feet of surface area.

The water filtration system 10 preferably rests on the bottom 15 of the aquatic environment, such that the filter intake 20 preferably extends at least 1.5 feet above the bottom of the aquatic environment. In situations where the filtration system 10 is used in shore wells or beach wells, the filter intake 20 may be small because excess silt would not be a significant problem. The housing 30 can be shaped and positioned to minimize the disturbing effects of a current in the aquatic environment. By positioning the filters 16 and 18 in a horizontal position, the bulk of the filtration system 10 is on the bottom and thus less likely to be disturbed by currents.

Referring again to FIGS. 3 and 4, it will be seen that copper screens 32 are encased around filters 16 and 18 and thereby substantially reduce the need to service the system 10. The copper is believed to be toxic to the veligers, and the use of the screens keeps the zebra mussels from growing on the filters 16 and 18. A copper screen 22 is also preferably used over the filter intake 20 to keep mussels from blocking the intake to the filtration system 10. The screen 22 on the filter intake 20 of the housing 30 also prevents larger organisms and debris from fouling the filtration system 10. In heavy silt environments, a series of screens could be employed. The screen(s) 22 and/or 32 are generally much cheaper than the filters 16 and 18, so that the screens can be added liberally to elongate the life of the filters.

The filters 16 and 18 should preferably be at least 40 microns or less, as dictated by the current findings of the ability of eggs and veligers to pass through various pore sizes. A 20 micron filter, e.g., also may be used. Filters of these pore sizes are commercially available from various plumbing supply manufacturers such as, e.g. the Pleato Electric and Filter Corporation, 113 Kean Street, West Babylon, N.Y. 11704. The filters 16 and 18 shown in FIGS. 3 and 4 are 100 square foot filters. This results in a total of 200 square feet of filter surface area for the whole filtration system 10. This has proved to be more than adequate for residential dwellings.

Previously, the filters 16 and 18 were attached to the collection lines by a slip sleeve connection. One may use such slip sleeve connection, and/or one may use other conventional connector means such as, e.g., a threaded slip connector. Other connector means will be readily apparent to those skilled in the art.

The filtration system's housing 30 can be constructed out of 6" polyvinyl chloride (PVC) tubing as shown and end caps 34 are included. If these end caps 34 are removed either underwater or back at a service center, the filters 16 and 18 could be easily removed from the collection line 28. While 6" PVC tubing is suggested for the embodiment shown, many different materials of various shapes and sizes could be used to implement the teachings of the present invention.

Many water systems use submersible pumps either in shore wells, beach wells, or directly out in a lake. The intake line connection can be connected to a housing for a submersible pump system such that the submersible pump is submerged entirely in water passing through the filtration system. The housing should always be large enough to allow enough filtered water to surround the pump to provide adequate cooling.

Figure 6:
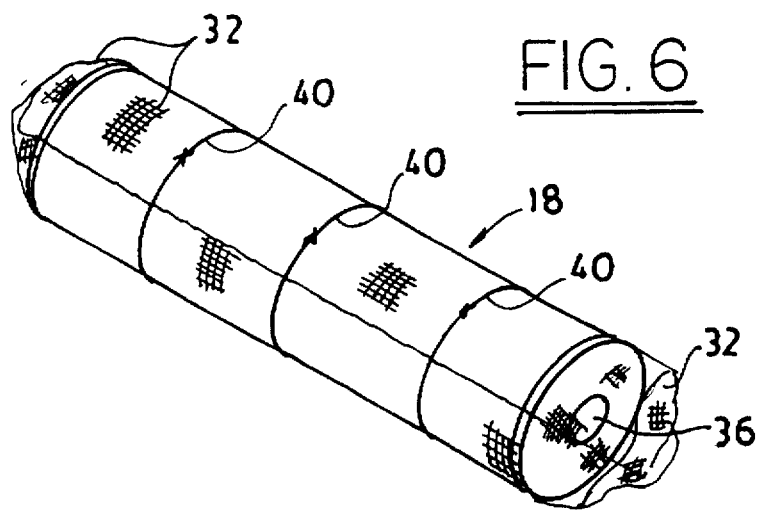
FIG. 6 is a perspective view of the filter assembly of the filtration system of FIG. 2.

Referring again to FIGS. 3 and 4, and in the preferred embodiment depicted therein, it is preferred that collection line 28 have an internal diameter of at least about 1.5 inches. Referring to FIG. 6, the collection line 28 is adapted to be connected within orifice of filter 16 or 18.

Referring to FIG. 4, it will be seen that collection lines 28 communicate with bulkhead connector 38, which also preferably has a 1.5Δ internal diameter.

As will be apparent to those skilled in the art, FIGS. 3 and 4 depict conventional means of connecting various lines.

FIG. 5 is an end view of the embodiment of FIG. 2 and a side view of intake 20.

FIG. 6 is a perspective view of filter 18, which, as will be appreciated by those skilled in the art, is substantially identical to filter 16. Referring to FIG. 6, it will be seen that copper wire 40 can be used to secure copper mesh 32 around the filter 18.

Figure 7:
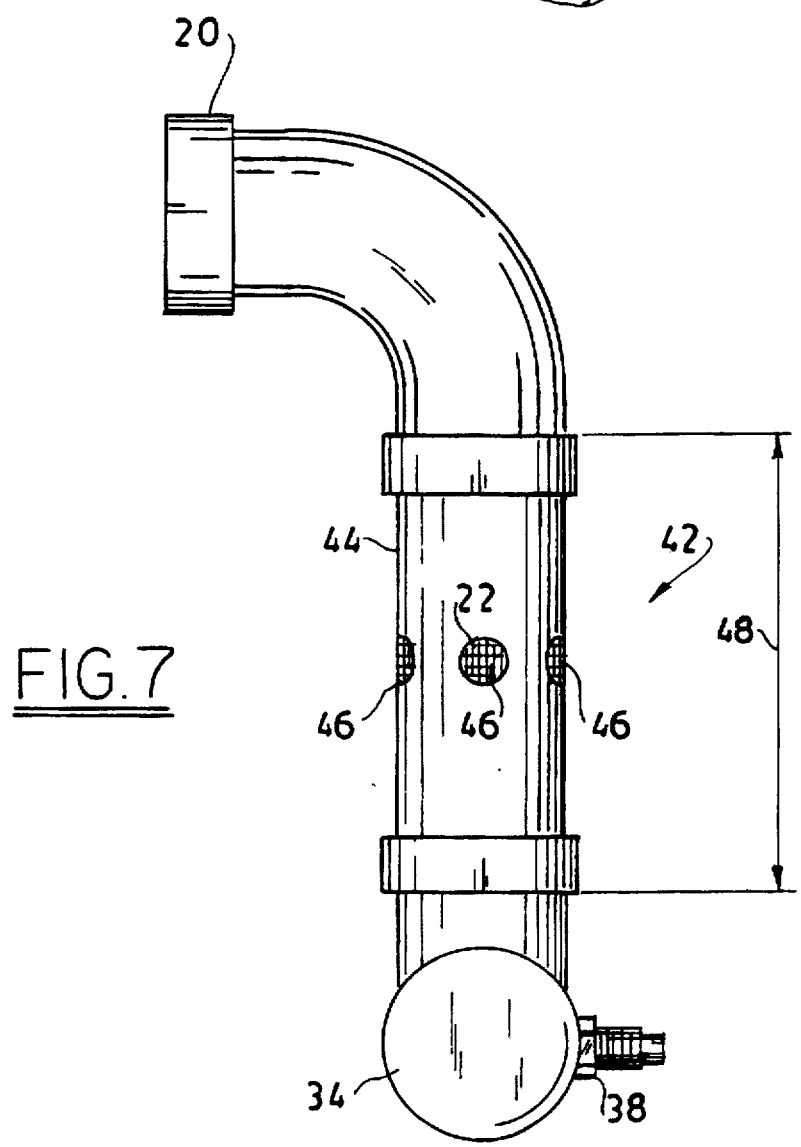
FIG. 7 is side view of an extended stack which can be used in the assembly of FIG. 2.

FIG. 7 is a side view of an intake stack 42 which can be used in place of the intake stack 41 depicted in FIG. 2. As will be apparent to those skilled in the art, stack 42 contains an optional intake filter section 44 with a multiplicity of orifices which communicate with copper screen 22. As will be apparent to those skilled in the art, if for any reason intake 20 becomes obstructed, fluid can still flow into device 10 through orifices 46.

It is preferred to have at least 3 orifices 46, each of which has a diameter of at least about 2.0. In one embodiment, at lest about 4 orifices 46 are used, each of which has a diameter of at least about 2.5 inches.

Referring again to FIG. 7, it will be seen that optional intake filter section 42 preferably has a height 48 of from about 8 to about 12 inches and, more preferably, from about 9.5 to about 10.5 inches.

Figure 8:
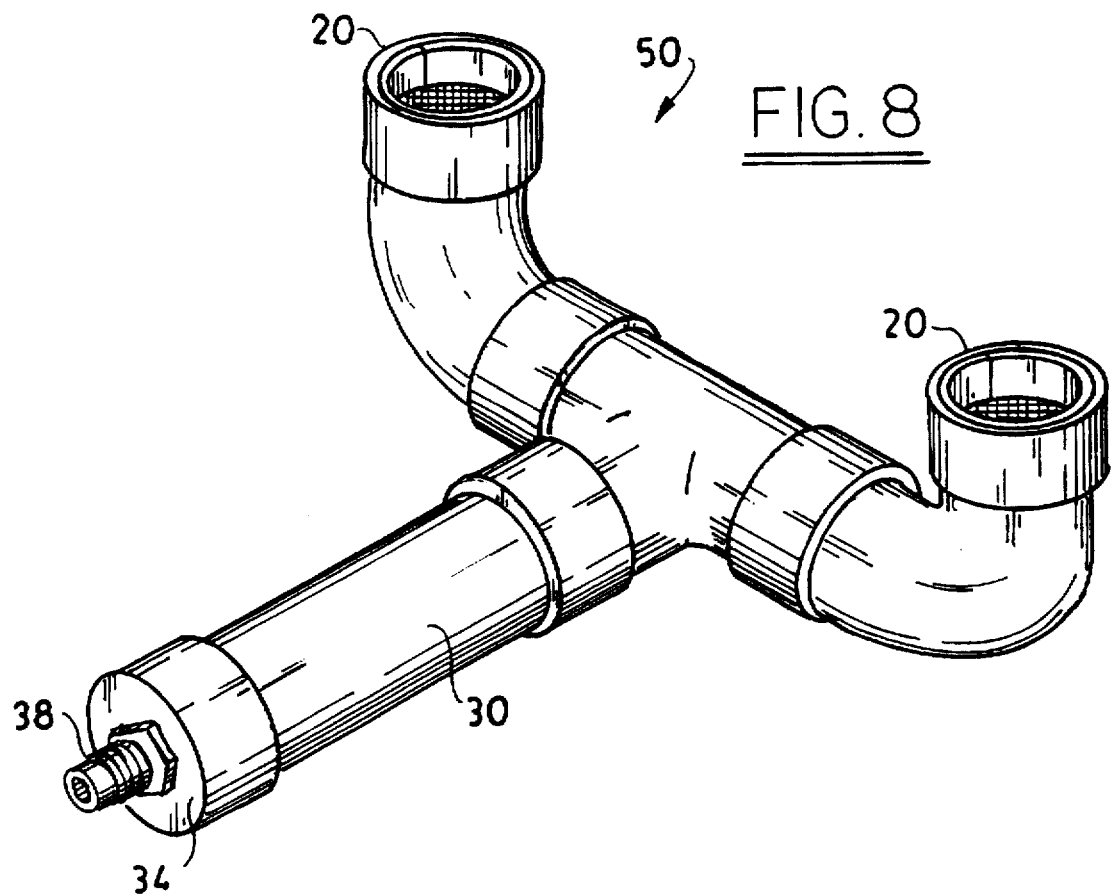
FIG. 8 is a perspective view of another embodiment of a filtration system.
Figure 9:
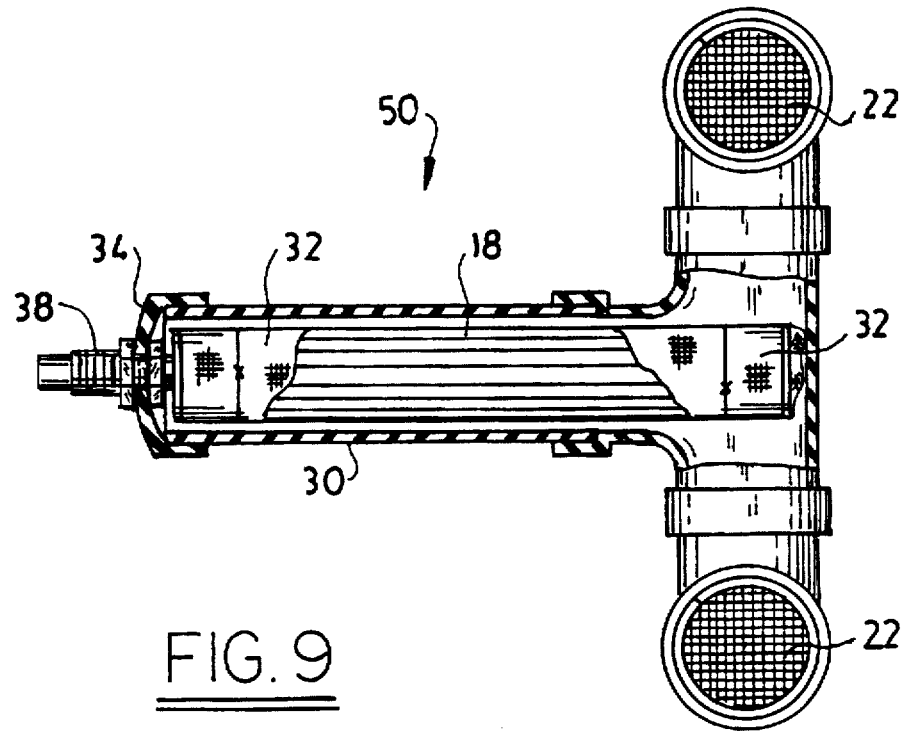
FIG. 9 is a top view of the filtration system of FIG. 8.

FIGS. 8 and 9 illustrate another filtration device which differs from the device 10 of FIGS. 1–7 in that it has two intakes 20 rather than one and only one filter 18 rather than two. Furthermore, in the embodiment depicted, the housing 30 has a 4.0 inch internal diameter rather than 6.0 inches, and the bulkhead outlet internal diameter is preferably 1.25 inches. The capacity of filter 18 is such that it has a surface area of 18 square feet.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A water filtration system for preventing a Zebra Mussel from entering a water system having a water intake line extending into an aquatic environment exposed to Zebra Mussels, wherein said filtration system comprises:

(a) an intake line connection for connecting said filtration system to said intake line;

(b) at least one water collection line extending from said intake line connection;

(c) a water intake which is disposed substantially parallel to said intake line connection and which is comprised of an orifice with a top surface and a copper screen recessed at least about 2.5 inches from said top surface of said orifice;

(d) a first water filter and a second water filter, wherein each of said first and second water filters has a largest pore size that is small enough to prevent passage of an egg or veliger of Zebra Mussels, operatively associated with each of said collection lines such that any water passing through said collection lines must pass through said filter and into said collection line;

(e) a copper screen surrounding each of said first water filter and said second water filter; and (f) a housing surrounding said each of said first water filter and said second water filter and including a first filter intake and a second filter intake.

2. The water filtration system as recited in claim 1, wherein said collection lines have an internal diameter of 1.5 inches.

3. The water filtration system as recited in claim 1, wherein said system is comprised of a connector for connecting said system to said water collection line.

4. The water filtration system as recited in claim 3, wherein said connector is a slip sleeve connector.

5. The water filtration system as recited in claim 1, wherein said water intake line is rotatable.

6. The water filtration system as recited in claim 1, wherein each of said first water filter and said second water filter has at least about 100 square feet of surface areas.

7. The water filtration system as recited in claim 1, wherein each of said first filter and said second filter has a filter size of less than 40 microns.

8. The water filtration system as recited in claim 2, wherein said system is comprised of a connector for connecting said system to said water collection line.

9. The water filtration system as recited in claim 8, wherein said connector is a slip sleeve connector.

10. The water filtration system as recited in claim 9, wherein said water intake line is rotatable.

11. The water filtration system as recited in claim 10, wherein each of said first water filter and said second water filter has at least about 100 square feet of surface area.

12. The water filtration system as recited in claim 11, wherein each of said first filter and said second filter has a filter size of less than 40 microns.

* * * * *